(12) United States Patent
Iida

(10) Patent No.: US 8,565,561 B2
(45) Date of Patent: Oct. 22, 2013

(54) POLARIZATION INDEPENDENT OPTICAL ISOLATOR

(75) Inventor: Junji Iida, Tokyo (JP)

(73) Assignee: SMM Precision Co., Ltd., Akita (JP)

( * ) Notice: Subject to any disclaimer, the term of this patent is extended or adjusted under 35 U.S.C. 154(b) by 203 days.

(21) Appl. No.: 13/247,051

(22) Filed: Sep. 28, 2011

(65) Prior Publication Data

US 2012/0294565 A1 Nov. 22, 2012

(30) Foreign Application Priority Data

May 19, 2011 (JP) ................................. 2011-112341

(51) Int. Cl.
*G02B 5/30* (2006.01)
*G02B 27/28* (2006.01)
*G02B 6/00* (2006.01)

(52) U.S. Cl.
USPC ................... 385/11; 359/484.03; 359/489.06

(58) Field of Classification Search
USPC ........................................ 359/484.03, 489.06
See application file for complete search history.

(56) References Cited

U.S. PATENT DOCUMENTS

| 4,548,478 A | 10/1985 | Shirasaki |
| 5,315,431 A | 5/1994 | Masuda |
| 2007/0014516 A1* | 1/2007 | Sato ................................ 385/31 |
| 2013/0050824 A1* | 2/2013 | Iida .......................... 359/484.03 |

FOREIGN PATENT DOCUMENTS

| JP | 2007-256616 A1 | 10/2007 |
| JP | 2010-48872 A1 | 3/2010 |

* cited by examiner

*Primary Examiner* — Jerry Rahll
(74) *Attorney, Agent, or Firm* — Kratz, Quintos & Hanson, LLP

(57) ABSTRACT

Provided is a polarization independent optical isolator including: wedge-shaped birefringent crystal plates each being made of a $YVO_4$ single crystal; a Faraday rotator 3 made of a magnetic garnet single crystal; and sapphire single crystal plates 2 and 4 bonded to light transmitting surfaces of the Faraday rotator, respectively. A light transmitting surface of each of the sapphire single crystal plates is formed in such a manner as to be offset from the c-plane of the sapphire single crystal plate. An incident angle θa of imaginary light on each of the sapphire single crystal plates, and an offset angles θoff of the light transmitting surface from the c-plane of each sapphire single crystal plates are set within predetermined ranges, the imaginary light being represented by a bisector of an angle formed by optical axes of the ordinary ray and the extraordinary ray.

8 Claims, 4 Drawing Sheets

POLARIZATION INDEPENDENT OPTICAL ISOLATOR

BACKGROUND OF THE INVENTION

1. Field of the Invention

The present invention relates to a polarization independent optical isolator using a Faraday rotator made of a magnetic garnet single crystal, and two wedge-shaped birefringent crystal plates, and more particularly to improvement of a polarization independent optical isolator, which prevents deterioration in characteristics and breakage of a magnetic garnet single crystal associated with rise in temperature due to light absorption by the magnetic garnet single crystal.

2. Description of the Related Art

An optical isolator is a non-reciprocal optical device having a function of allowing an optical signal to pass therethrough in the forward direction and preventing an optical signal from passing therethrough in the reverse direction. For example, an optical isolator is used in an optical communication system using a semiconductor laser as a light source in order to prevent oscillation of the semiconductor laser from being unstable due to returning of a reflected optical signal to the light source side.

Optical isolators can be broadly classified into polarization dependent optical isolators such as those used for semiconductor laser modules, and polarization independent optical isolators such as those used in front of and behind optical fiber amplifiers.

In a general polarization independent optical isolator, two wedge-shaped birefringent crystal plates made of rutile, $YVO_4$, $LiNbO_3$, or the like are used as polarizers, and a flat plate made of a magnetic garnet single crystal is placed, as a Faraday rotator, between the two wedge-shaped birefringent crystal plates (see Patent Document 1: U.S. Pat. No. 4,548,478, and Patent Document 2: U.S. Pat. No. 5,315,431). Here, the Faraday rotator has a crystal thickness adjusted so that the Faraday rotator can rotate the polarization by 45 degrees, and the two wedge-shaped birefringent crystal plates are placed such that the directions of the optic axes thereof are shifted from each other by 45 degrees. Note that an optical element unit including the polarizers and the Faraday rotator is referred to as a non-reciprocal unit.

Light incident on a first wedge-shaped birefringent crystal plate in the forward direction is separated into an ordinary ray and an extraordinary ray by the first wedge-shaped birefringent crystal plate. Since the Faraday rotator rotates the polarization by 45 degrees, and since the optic axis of a second wedge-shaped birefringent crystal plate is shifted from that of the first wedge-shaped birefringent crystal plate by 45 degrees, the ordinary ray is incident on the second wedge-shaped birefringent crystal plate as an ordinary ray, and the extraordinary ray is incident thereon as an extraordinary ray. Then, the rays exit as parallel light from the second wedge-shaped birefringent crystal plate, and are coupled with an optical fiber by a collimator lens.

Light traveling in the reverse direction is separated into an ordinary ray and an extraordinary ray by the second wedge-shaped birefringent crystal plate. After rotated by the Faraday rotator by 45 degrees, the ordinary ray is incident on the first wedge-shaped birefringent crystal plate as an extraordinary ray, and the extraordinary ray is incident thereon as an ordinary ray. Hence, light exiting from the first wedge-shaped birefringent crystal plate is not parallel, and is not coupled with the core of the optical fiber. The optical isolator functions in such a manner.

Here, the magnetic garnet single crystal constituting the Faraday rotator hardly involves problems in the near-infrared wavelength region, in particular, around a wavelength region (1.2 μm to 1.7 μm) used for optical communications. This is because, in such a region, the magnetic garnet single crystal exhibits an excellent optical transparency, and only slightly undergoes temperature rise due to absorption of light, as long as the light is about several hundreds milliwatts. However, in an shorter wavelength region than the above-described wavelength region, in particular, in the wavelength region around 1 μm, which is employed for excitation light of YAG lasers, fiber lasers which attract an attention as alternatives to the YAG lasers, and optical fiber amplifiers, the absorption of light by the magnetic garnet single crystal is increased, resulting in a non-negligible temperature rise at an laser power of several hundreds milliwatts.

A paramagnetic single crystal or a paramagnetic glass may be used as a Faraday rotator used for an optical isolator designed for the wavelength region around 1 μm. However, when such a material is used, not only the size of the Faraday rotator itself is increased, but also a large magnet is required to magnetically saturate the Faraday rotator. As a result, the optical isolator also becomes large.

In this respect, an optical isolator for the 1-μm band has been required to be small, and to withstand laser light with a high-power, recently.

Patent Document 3 (Japanese Patent Application Publication No. 2007-256616) describes a polarization independent optical isolator including c-plane sapphire single crystal plates bonded to optical surfaces of a magnetic garnet single crystal to suppress the temperature rise. This configuration is intended to achieve an optical isolator having high-power-laser resistance, while a magnetic garnet single crystal is used as a Faraday rotator.

However, in the case of the polarization independent optical isolator described in Patent Document 3, when the magnetic garnet single crystal (Faraday rotator) to which the c-plane sapphire single crystal plates are bonded is incorporated into an optical isolator, the magnetic garnet single crystal (Faraday rotator) needs to be individually placed while being inclined, such that the angle of light incident on each of the c-plane sapphire single crystal plates is 1 to 6 degrees with respect to the c-axis. This leads to a disadvantage that the assembly costs of the optical isolator is increased.

In this respect, Patent Document 4 (Japanese Patent Application Publication No. 2010-048872) proposes a polarization independent optical isolator with which the disadvantage of Patent Document 3 is eliminated.

Specifically, the polarization independent optical isolator is characterized in that a light transmitting surface of each of the sapphire single crystal plates is formed in such a manner as to be parallel to a non-inclined light transmitting surface of a corresponding adjacent one of the wedge-shaped birefringent crystal plates, and to be offset from a c-plane of the sapphire single crystal plate, and the bisector of an angle formed by optical axes of an ordinary ray and an extraordinary ray separated by each of the wedge-shaped birefringent crystal plates is perpendicular to the c-plane of each of the sapphire single crystal plates (in other words, the c-plane of a sapphire single crystal plate 2 is offset by an angle θ formed by the bisector α of the angle formed by the optical axes of an ordinary ray and an extraordinary ray separated by the wedge-shaped birefringent crystal plate and an axis perpendicular to a light transmitting surface of the sapphire single crystal plate 2, as shown in FIG. 7).

Note that the term "offset" is a term mainly used in the field of crystal growth and the like. For example, a sapphire single crystal plate obtained by cutting a sapphire ingot along a plane perpendicular to the c-axis is referred to as a "c-plane sapphire single crystal plate," whereas a sapphire single crystal plate obtained by cutting a sapphire ingot along a plane inclined from a plane perpendicular to the c-axis by an angle θ is referred to as a "sapphire single crystal plate having an offset angle θ from the c-plane."

The polarization independent optical isolator described in Patent Document 4 is characterized in that the bisector of an angle formed by the optical axes of an ordinary ray and an extraordinary ray separated by the wedge-shaped birefringent crystal plate is perpendicular to the c-plane of each of the sapphire single crystal plates (in other words, the c-plane of each of the sapphire single crystal plates is offset by an angle formed by the bisector and the axis perpendicular to the light transmitting surface of the sapphire single crystal plate). Here, when an effect of refraction of imaginary light represented by the bisector incident on the sapphire single crystal plate is taken into consideration, the peak isolation may be about 35 dB in some cases. There has still been a problem that it is difficult to fabricate an optical isolator having such a high performance that the peak isolation can be 40 dB or more stably. This is because, in the case where the refraction of the imaginary light represented by the bisector in the sapphire is taken into consideration, it is impossible to precisely express the angle formed by the beam of light in the sapphire and the c-axis of the sapphire by use of the bisector of the angle formed by the optical axes of the ordinary ray and the extraordinary ray separated by the wedge-shaped birefringent crystal plate. As a result, the angle formed by the ordinary ray and the c-axis, or the angle formed by the extraordinary ray and the c-axis may be larger than the angle formed by the bisector and the c-axis in some cases, which may lead to deterioration in extinction ratio. For this reason, the peak isolation may be less than 40 dB depending on the polarization in some cases.

Moreover, when the polarization independent optical isolator described in Patent Document 4 is used as an optical isolator for a fiber laser, the following problem arises. Specifically, when the optical feedback couples with the cladding of an incident side optical fiber, and propagates through the cladding, an optical system placed on the inlet side of the incident side optical fiber may be damaged, because the intensity of the optical feedback passing through the optical isolator is higher than that of an optical isolator for optical communication.

SUMMARY OF THE INVENTION

The present invention has been made in view of such problems, and an object thereof is to provide a polarization independent optical isolator, at low costs, which enables temperature rise of a Faraday rotator to be suppressed even when high-power light is incident, which has a peak isolation of 40 dB or more stably, and which allows no optical feedback to couple with the cladding of an incident side optical fiber, when used as an optical isolator for a fiber laser.

The present invention has been completed through the "experiment" and "technical examinations" conducted by the present inventors as will be described below.

Specifically, the present invention provides a polarization independent optical isolator comprising:
a pair of wedge-shaped birefringent crystal plates placed on an optical path;
a Faraday rotator which is placed, on the optical path, between the wedge-shaped birefringent crystal plates and which is made of a magnetic garnet single crystal;
collimator lenses which are placed, on the optical path, at positions outside the respective wedge-shaped birefringent crystal plates in relation to the Faraday rotator taken as a center; and
sapphire single crystal plates bonded to light transmitting surfaces of the Faraday rotator, respectively, wherein
the pair of wedge-shaped birefringent crystal plates are each made of a $YVO_4$ single crystal,
a light transmitting surface of each of the sapphire single crystal plates is formed in such a manner as to be parallel to a non-inclined light transmitting surface of a corresponding adjacent one of the wedge-shaped birefringent crystal plates, and to be offset from a c-plane of the sapphire single crystal plate, and
the polarization independent optical isolator is set to satisfy the following conditions:
an incident angle $\theta a$ of imaginary light on each of the sapphire single crystal plates is 6.06 to 9.61 degrees, the imaginary light being represented by a bisector of an angle formed by optical axes of an ordinary ray and an extraordinary ray separated by each of the wedge-shaped birefringent crystal plates;
an offset angle $\theta off$ of the light transmitting surface from the c-plane of each sapphire single crystal plate is 3.05 to 5.67 degrees; and
3 mm$\geq$f$\geq$18.2/$\theta a$ (mm), where f represents a focal length of each of the collimator lenses.

In the polarization independent optical isolator according to the present invention, the incident angle $\theta a$ of imaginary light on the sapphire single crystal plate is set to 6.06 to 9.61 degrees, the imaginary light being represented by the bisector of the angle formed by the optical axes of an ordinary ray and an extraordinary ray separated by each of the wedge-shaped birefringent crystal plates, and the offset angle $\theta off$ of the light transmitting surface from the c-plane of each sapphire single crystal plate is set to 3.05 to 5.67 degrees. As a result, the ordinary ray and the extraordinary ray separated by the wedge-shaped birefringent crystal plate are incident on the sapphire single crystal plate substantially perpendicularly to the c-plane thereof. For this reason, the polarization independent optical isolator according to the present invention makes it possible to minimize the adverse effect on the extinction ratio due to the birefringence of the sapphire single crystals, and to obtain a peak isolation of 40 dB or more stably.

Moreover, the polarization independent optical isolator is set to satisfy the following conditions:
the incident angle $\theta a$ is 6.06 to 9.61 degrees,
the offset angle $\theta off$ is 3.05 to 5.67 degrees, and
3 mm$\geq$f$\geq$18.2/$\theta a$ (mm), where f represents the focal length of each of the collimator lenses. Hence, the coupling of the optical feedback with the cladding of an incident side optical fiber can be avoided. As a result, even when the polarization independent optical isolator according to the present invention is used as an optical isolator for a fiber laser, an optical system placed on an inlet side of the incident side optical fiber is not damaged by the optical feedback propagating through the cladding.

DESCRIPTION OF THE PREFERRED EMBODIMENTS

Hereinafter, the present invention will be described in detail.

The present invention has been completed through the following "experiment" and "technical examinations," which were conducted by the present inventors to solve the problems of conventional technologies.

[Experiment]

Specifically, in order to solve the problems of conventional technologies, the present inventors conducted the following experiment. An experimental structure was fabricated in which c-plane sapphire single crystal plates were bonded to optical surfaces of a magnetic garnet single crystal magnetically saturated by placing a magnet therearound. Then, linearly polarized light with various directions was caused to be incident on the experimental structure, with the incident angle on the c-plane sapphire single crystal plates in the experimental structure being varied. Thus, a value which gave the worst extinction ratio was determined.

Figure 3:
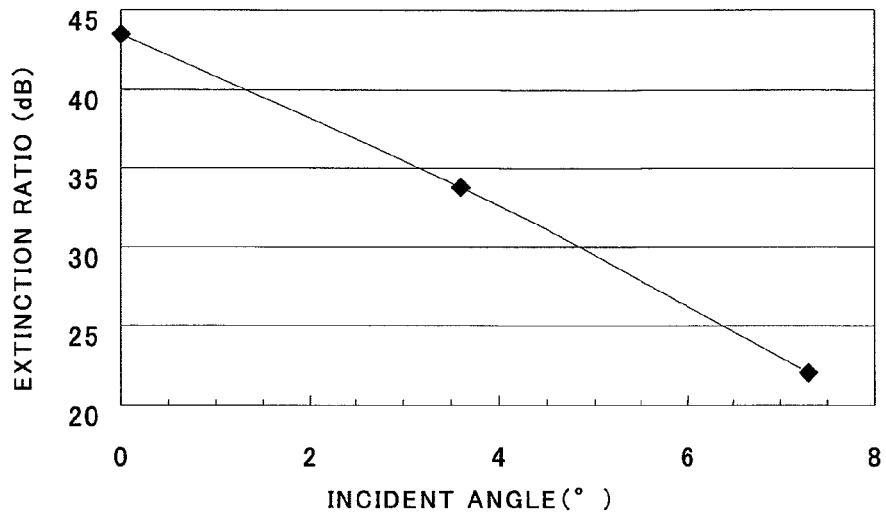
FIG. 3 is a graph showing the relationship between an "incident angle (degrees)" and an "extinction ratio (dB)", which were measured when linearly polarized light was incident on an experimental structure in which c-plane sapphire single crystals were bonded to optical surfaces of a magnetically saturated magnetic garnet single crystal with the incident angle on the c-plane sapphire single crystal plates being varied.

The result of the determination is shown in the graph of FIG. 3.

From the result shown in the graph of FIG. 3, it has been found that the obtained extinction ratio is stably 40 dB or more, as long as the incident angle (the angle formed by the c-axis of the sapphire and the incident light, i.e., the angle of the incident light with respect to the c-axis) of light incident on the c-plane sapphire single crystal plate is 1.3 degrees or less.

Note that, since the incident light is refracted when incident on the sapphire single crystal plate, the angle formed by the c-axis and the optical axis of a beam of light incident at an incident angle of 1.3 degrees is 0.74 degrees in the c-plane sapphire single crystal plate according to Snell's law. In this case, the angle formed by the optical axis of the incident light and the c-axis is 0.74 degrees, the birefringence of sapphire is sufficiently small, and the incident light is incident almost in parallel with the c-axis in the c-plane sapphire single crystal plate. Hence, in discussing the separation of incident light due to the birefringence of sapphire, it is unnecessary to consider the extraordinary ray, but only the ordinary ray need to be considered.

[Technical Examinations]

Next, examinations were conducted for the conditions under which the angle formed by each of the "ordinary ray" and the "extraordinary ray" separated by the wedge-shaped birefringent crystal plate and the c-axis of the sapphire single crystal plate is 0.74 degrees or less in the sapphire single crystal plate, as described above.

Figure 1A:
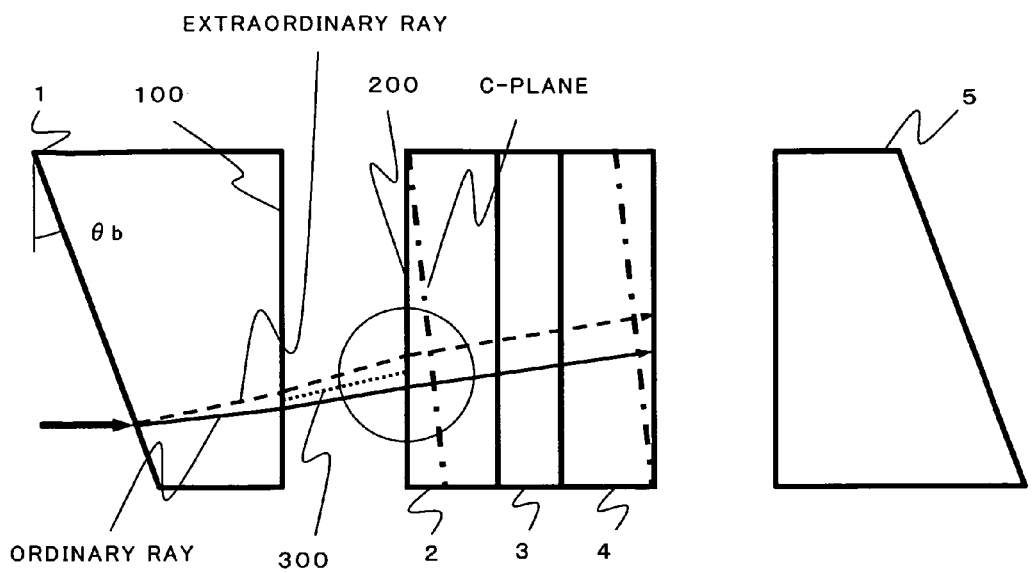
FIG. 1A is a view for illustrating an incident angle $\theta a$ of imaginary light on a sapphire single crystal plate, and an offset angle $\theta off$ of a light transmitting surface from the c-plane of the sapphire single crystal plate in a polarization independent optical isolator, the imaginary light being represented by the bisector of the angle formed by the optical axes of an ordinary ray and an extraordinary ray separated by a wedge-shaped birefringent crystal plate, where reference numeral 100 denotes a non-inclined light transmitting surface of the wedge-shaped birefringent crystal plate, reference 200 denotes the light transmitting surface of the sapphire single crystal plate, and reference numeral 300 denotes an optical axis of the imaginary light represented by the bisector of the angle formed by the optical axes of the ordinary ray and the extraordinary ray.
Figure 1B:
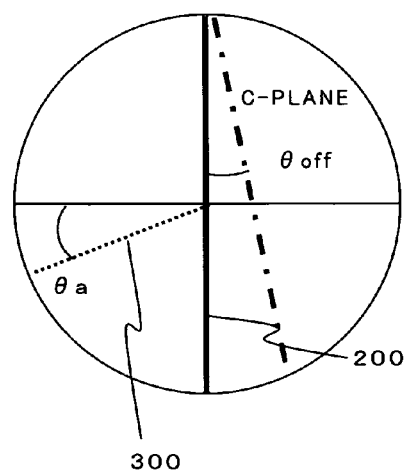
FIG. 1B is a partially enlarged view of FIG. 1A.

Specifically, as shown in FIGS. 1A and 1B, examinations were conducted for an incident angle θa of imaginary light on each of the sapphire single crystal plates 2 and 4, the imaginary light being represented by a bisector of an angle formed by optical axes of an ordinary ray and an extraordinary ray separated by each of the wedge-shaped birefringent crystal plates 1 and 5 on the incident side and the exiting side in the forward direction, as well as an offset angle θoff of the light transmitting surface from the c-plane of each sapphire single crystal plate 2 or 4, while the focal lengths of the collimator lenses used in a polarization independent optical isolator were also taken into consideration.

Figure 2:
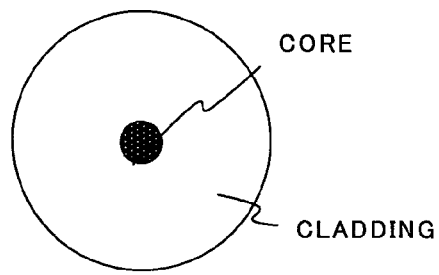
FIG. 2 is a view for illustrating a cross-section of an optical fiber including a core and cladding.

Here, in examining the incident angle θa and the offset angle θoff, the coupling of optical feedback with cladding also needs to be taken into consideration as will be described below for an optical isolator on which high-power laser light is incident. In this respect, FIG. 2 shows a cross-section of an optical fiber including a core and cladding. Note that an optical fiber for an in-line optical isolator used for a fiber laser with a wavelength of around 1.06 μm generally has a fiber core diameter of 6 μm, and a fiber cladding diameter of 125 μm.

(1) Incident Angle θa of Imaginary Light on Sapphire Single Crystal Plate

Figure 5A:
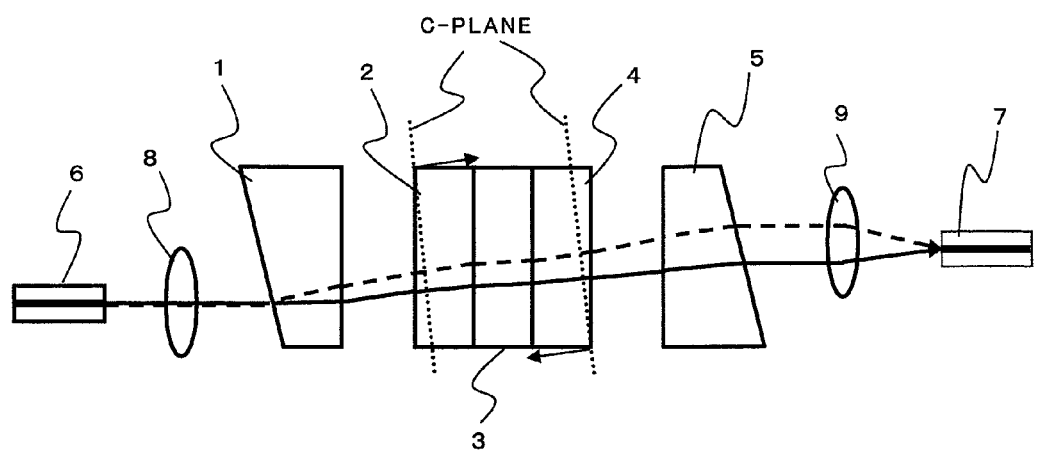
FIGS. 5A and 5B are views for illustrating an operation of the polarization independent optical isolator according to the present invention.
Figure 5B:
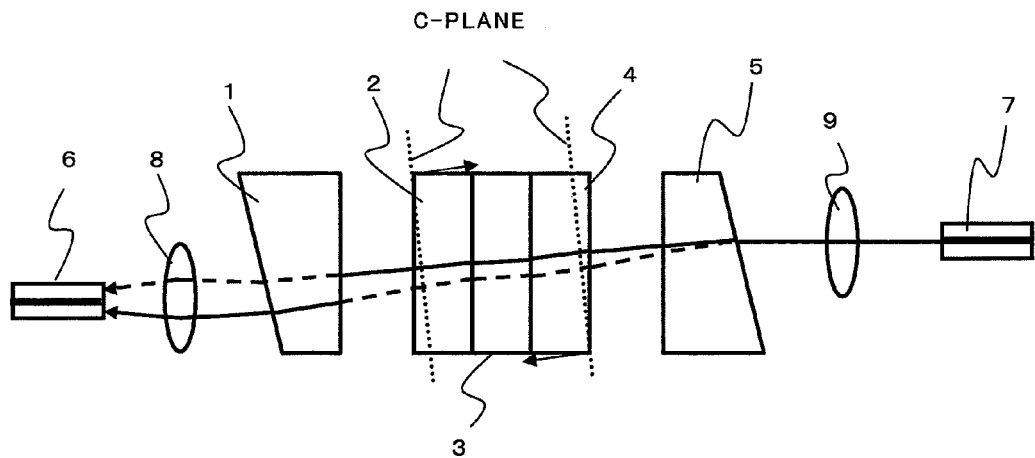

When the incident angle θa is too small, optical feedback in the reverse direction (the opposite direction to the forward direction) shown in FIG. 5B returns to the vicinity of the core of an optical fiber 6 through a collimator lens 8 on the incident side, and couples with the core, resulting in deterioration of the isolation. In addition, even when the optical feedback does not couple with the core, but couples with the cladding, the optical feedback coupling with the cladding may propagate through the cladding, and may damage an optical system present on the inlet side of an incident side optical fiber in the case of an optical isolator for a fiber laser, where the intensity of light passing through an optical isolator is higher than the case of an optical isolator for optical communications. Accordingly, in the case of an optical isolator for a fiber laser, the incident angle θa needs to be larger than that for an optical isolator for optical communications.

However, too large an incident angle θa leads to a large amount of shift (displacement) of the optical axis due to refraction of light. This requires the wedge-shaped birefringent crystal plates and the Faraday rotator to have increased sizes. Hence, too large an incident angle θa is uneconomical.

Moreover, when the wedge angle θb of the wedge-shaped birefringent crystal plates is increased in order to increase the incident angle θa, the separation distance between the ordinary ray and the extraordinary ray is increased, so that the polarization dependent loss (PDL) is increased. Correction of the polarization dependent loss requires a compensating optical system, which also leads to the increase in costs.

Accordingly, in setting the incident angle θa of imaginary light on the sapphire single crystal plate, it is necessary to set the incident angle θa within a range satisfying conditions under which the optical feedback is difficult to couple with the cladding of the incident side optical fiber, the economy is not deteriorated, and the PDL are not increased.

(2) Offset Angle θoff of Light Transmitting Surface from c-Plane of Sapphire Single Crystal Plate When the incident angle θa and the offset angle θoff are fixed, an actual optical path is determined in each of the sapphire single crystal plates 2 and 4 shown in FIG. 1A. As long as the angle formed by the optical path of each of the ordinary ray and the extraordinary ray which have been separated by the wedge-shaped birefringent crystal plate 1 or 5, and which are incident on the sapphire single crystal plates, and the c-axis of the sapphire single crystal plate is 0.74 degrees or less as described above, a small ratio of the ordinary ray which has been separated by the wedge-shaped birefringent crystal plate is separated into an extraordinary ray in the sapphire single crystal plate, and a small ratio of the extraordinary ray which has been separated by the wedge-shaped birefringent crystal plate is separated into an ordinary ray in the sapphire single crystal plate. Hence, as confirmed by the graph of FIG. 3, the extinction ratio is 40 dB or more, so that the peak isolation is stably 40 dB or more.

(3) Relationship Between Beam Size and Lens Focal Length

A beam size in the magnetic garnet single crystal is given by a product of the numerical aperture of an optical fiber and the focal length of a collimator lens used in the optical isolator.

To suppress heat generation in the magnetic garnet single crystal, it is advantageous that the energy density of laser light incident on the magnetic garnet single crystal is low. Hence, a larger focal length of the collimator lens seems preferable. However, when the focal length of the collimator lens is large, not only the sizes of the magnetic garnet single crystal and the wedge-shaped birefringence crystals are increased, but also the position adjustment of the optical fibers with respect to both the collimator lenses requires high precision. Hence, a large focal length is not suitable for mass production.

In consideration of the above-described things, the focal length of each of the collimator lenses needs to be 3 mm or less in the case of mass products.

(4) Position of Incidence of Optical Feedback on Fiber Edge Surface

For ordinary optical fibers each having a core diameter of 6 μm and a cladding diameter of 125 μm conditions (the wedge angle θb, the incident angle θa, and the focal lengths f of the lenses used as the collimators) under which the optical feedback does not couple with the cladding are examined.

As shown in FIG. 5B, the optical feedback returns to the vicinity of the core of the optical fiber 6 through the collimator lens 8. The degree of the shift of the optical feedback from the center of the core on the edge surface of the optical fiber 6 is given by the product of the exit angle of the optical feedback from the wedge-shaped birefringence crystal 1 and the focal length f of the collimator lens 8. The magnitude of the exit angle depends on the wedge angle θb of the wedge-shaped birefringence crystal. If the focal length f of the collimator lens is small, it is impossible to prevent the optical feedback from coupling with the cladding of the optical fiber, unless a birefringence crystal having a large wedge angle θb is used.

Here, the wedge angle θb of the wedge-shaped birefringence crystal and the incident angle θa are assumed to be in one-to-one correspondence (a relationship in which the determination of the wedge angle θb of the wedge-shaped birefringence crystal entails the determination of the incident angle θa). Under such an assumption, a condition under which the amount of shift of an optical feedback on an edge surface of the optical fiber 6 was larger than 62.5 μm, which was the radius of the cladding, was determined by setting multiple sets (nine sets in FIG. 6) of the incident angle θa and the focal length f of the collimator lens 8. As a result, the result shown by the curve in FIG. 6 was obtained from the data on the nine sets. Moreover, from the curve, a condition was found under which the amount of shift of the optical feedback on the edge surface of the optical fiber 6 is larger than 62.5 μm, which was the radius of the cladding, i.e., a condition of f≥18.2/θa (mm) was found.

Figure 6:
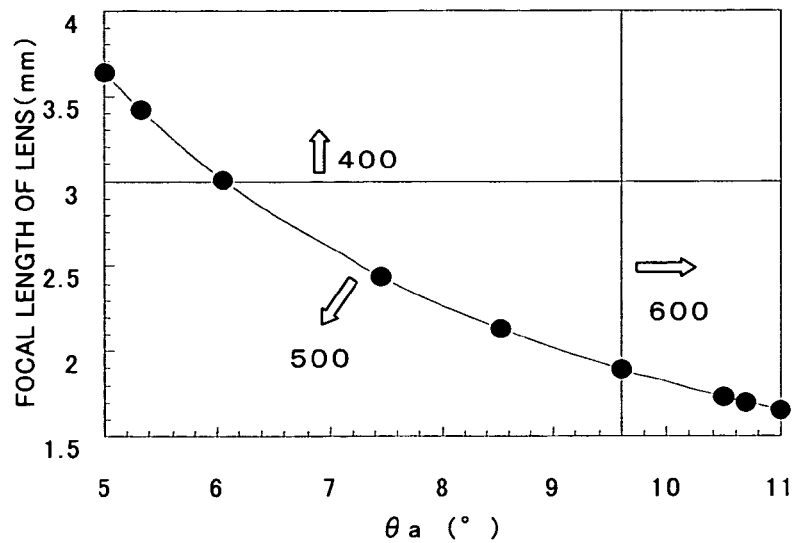
FIG. 6 is a graph showing the relationship between an "incident angle θa" and a "focal length of a lens" obtained when a condition under which the amount of shift of an optical feedback on an edge surface of an optical fiber was larger than 62.5 μm, which was the radius of cladding, were determined by setting nine sets of an incident angle θa and a focal length f of a collimator lens, where reference numeral 400 denotes a condition where positional adjustment is difficult, reference numeral 500 denotes a condition where coupling with the cladding is large, and reference numeral 600 denotes a condition of being uneconomical.
Figure 7:
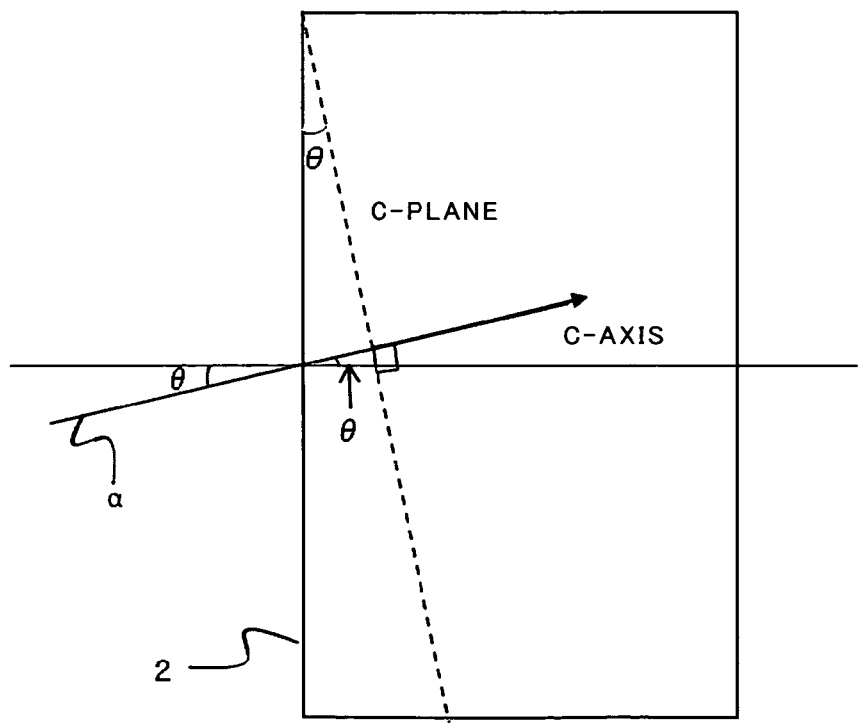
FIG. 7 is a view for illustrating an offset angle of a light transmitting surface from the c-plane of a sapphire single crystal plate in a polarization independent optical isolator described in Patent Document 4.

Specifically, on the basis of the curve in FIG. 6, in order for the amount of shift of the optical feedback on the edge surface of the optical fiber 6 to be larger than 62.5 μm, which is the radius of the cladding, it is necessary to satisfy the condition of f≥18.2/θa (mm), where f represents the focal length of the lens used as the collimator.

(5) θb, θa, θoff in Case where Wedge-Shaped Birefringent Crystal Plates were Made of $YVO_4$ Crystals Next, for ordinary optical fibers each having a core diameter of 6 μm and a cladding diameter of 125 μm, specific conditions (the wedge angle θb, the incident angle θa, the offset angle θoff, and the focal lengths f of the lenses used as the collimators) under which a peak isolation of 40 dB or more was secured, and the optical feedback did not coupled with the cladding were investigated.

Here, Table 1 shows the results obtained when two kinds of collimator lenses having a focal lengths of 2 mm or 3 mm were used.

TABLE 1

| Condition | θb (degrees) | θa (degrees) | θoff (degrees) | f = 3 mm | f = 2 mm |
|---|---|---|---|---|---|
| 1 | 5.0 | 5.32 | 2.58 to 3.47 | Δ | Δ |
| 2 | 5.7 | 6.06 | 3.05 to 3.85 | ○ | Δ |
| 3 | 7.0 | 7.46 | 3.92 to 4.54 | ○ | Δ |
| 4 | 8.0 | 8.53 | 4.59 to 5.12 | ○ | Δ |
| 5 | 9.0 | 9.61 | 5.26 to 5.67 | ○ | ○ |
| 6 | 10.0 | 10.70 | 5.93 to 6.22 | x | x |

(Note)
θb (degrees): wedge angle θb (degrees)
θa (degrees): incident angle θa (degrees)
θoff (degrees): offset angle θoff (degrees) at which an angle from the c-axis of 0.74 degrees or less was secured.
f = 3 mm: focal length 3 mm
f = 2 mm: focal length 2 mm
○: hard to couple with the cladding
Δ: easy to couple with the cladding
x: uneconomical, large PDL The present invention has been completed on the basis of the condition derived from the above-described examined items (1) to (5) and shown in the graph of FIG. 6 and the data shown in "Conditions 2 to 5" in the Table 1.

Specifically, the present invention provides a polarization independent optical isolator comprising:

a pair of wedge-shaped birefringent crystal plates placed on an optical path;

a Faraday rotator which is placed, on the optical path, between the wedge-shaped birefringent crystal plates and which is made of a magnetic garnet single crystal;

collimator lenses which are placed, on the optical path, at positions outside the respective wedge-shaped birefringent crystal plates in relation to the Faraday rotator taken as a center; and sapphire single crystal plates bonded to light transmitting surfaces of the Faraday rotator, respectively, wherein the pair of wedge-shaped birefringent crystal plates are each made of a $YVO_4$ single crystal, a light transmitting surface of each of the sapphire single crystal plates is formed in such a manner as to be parallel to a non-inclined light transmitting surface of a corresponding adjacent one of the wedge-shaped birefringent crystal plates, and to be offset from a c-plane of the sapphire single crystal plate, and the polarization independent optical isolator is set to satisfy the following conditions:

an incident angle $\theta a$ of imaginary light on each of the sapphire single crystal plate is 6.06 to 9.61 degrees, the imaginary light being represented by a bisector of an angle formed by optical axes of an ordinary ray and an extraordinary ray separated by each of the wedge-shaped birefringent crystal plates;

an offset angle $\theta off$ of the light transmitting surface from the c-plane of each sapphire single crystal plate is 3.05 to 5.67 degrees; and 3 mm≥f≥18.2/$\theta a$ (mm), where f represents a focal length of each of the collimator lenses.

Hereinafter, an embodiment of the present invention will be described in detail.

Figure 4:
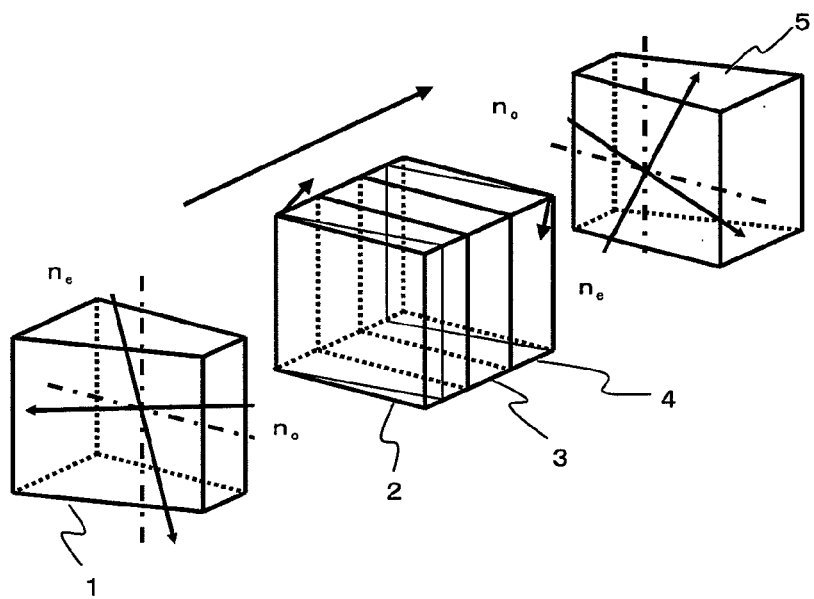
FIG. 4 is a schematic perspective view showing the configuration of a non-reciprocal unit of a polarization independent optical isolator according to the present invention.

First, as shown in FIG. 4, a polarization independent optical isolator according to the embodiment includes a first wedge-shaped birefringent crystal plate 1, a first sapphire single crystal plate 2, a magnetic garnet single crystal (Faraday rotator) 3, a second sapphire single crystal plate 4, and a second wedge-shaped birefringent crystal plate 5, which are placed in this order in the direction of light transmission.

In addition, a light transmitting surface of each of the first sapphire single crystal plate 2 and the second sapphire single crystal plate 4 is formed in such a manner as to be parallel to a non-inclined light transmitting surface of a corresponding adjacent one of the first wedge-shaped birefringent crystal plate 1 and the second wedge-shaped birefringent crystal plate 5, and to be offset from the c-plane of the sapphire single crystal plate 2 or 4. Moreover, in order that both the ordinary ray and the extraordinary ray separated by each of the wedge-shaped birefringent crystal plates 1 and 5 can be 0.74 degrees or less with respect to the c-axis of the of the sapphire single crystal plates 2 and 4, the above-described incident angle $\theta a$ is set to 6.06 to 9.61 degrees, and the offset angle $\theta off$ of the light transmitting surface from the c-plane of the sapphire single crystal plate is set to 3.05 to 5.67 degrees.

Note that the condition of "3 mm≥f≥18.2/$\theta a$ (mm)" is satisfied, where f represents the focal length of each of the collimator lenses 8 and 9 (see FIG. 5) incorporated into the polarization independent optical isolator. In addition, ordinary optical fibers 6 and 7 (see FIG. 5) each having a core diameter of 6 μm and a cladding diameter of 125 μm are used.

The polarization independent optical isolator functions as follows.

First, as shown in FIG. 5A, light exiting from the core of the optical fiber 6 in the forward direction is converted into parallel light by the collimator lens 8, and is incident on the first wedge-shaped birefringent crystal plate 1. The light incident on the first wedge-shaped birefringent crystal plate 1 is separated into an ordinary ray and an extraordinary ray, which are then incident on the first sapphire single crystal plate 2. Here, the two kinds of the ordinary ray and the extraordinary ray are refracted at the interface between the air and the first sapphire single crystal plate 2. The light passing through the sapphire single crystal plate 2 is refracted again at the interface with the magnetic garnet single crystal (Faraday rotator) 3. Further, after the polarization plane is rotated by 45 degrees, the light is refracted at the interface with the second sapphire single crystal plate 4. Then, the light passes through the sapphire single crystal plate 4, is refracted at the interface between the sapphire single crystal plate 4 and the air, and is incident on the second wedge-shaped birefringent crystal plate 5.

Here, in the polarization independent optical isolator according to the embodiment, the light is separated into the ordinary ray and the extraordinary ray by the first wedge-shaped birefringent crystal plate 1, and then the ordinary ray is incident on the second wedge-shaped birefringent crystal plate 5 as an ordinary ray, and the extraordinary ray is incident thereon as an extraordinary ray. Hence, the light exiting from the second wedge-shaped birefringent crystal plate 5 is parallel light, and can be coupled with the core of the optical fiber 7 on the exiting side by the collimator lens 9.

At this time, both the ordinary ray and the extraordinary ray separated by the first wedge-shaped birefringent crystal plate 1 are incident on the first sapphire single crystal plate 2 almost perpendicularly to the c-plane thereof, and the magnetic garnet single crystal 3 can be considered to be a parallel and flat plate. Hence, the beams of light are incident on the second sapphire single crystal plate 4 also substantially perpendicularly to the c-plane thereof. Accordingly, the deterioration in extinction ratio in the sapphire single crystal plates can be minimized.

In addition, as shown in FIG. 5B, the light returning in the reverse direction passes through the collimator lens 9, is separated into an ordinary ray and an extraordinary ray by the second wedge-shaped birefringent crystal plate 5, and is rotated by the magnetic garnet single crystal (Faraday rotator) 3 by 45 degrees. Then, as with the case of the forward direction, the deterioration in the extinction ratio can be minimized during the traveling of light through the sapphire single crystal plates. As a result, a phenomena is suppressed in which the ordinary ray from the second wedge-shaped birefringent crystal plate 5 is retained as an ordinary ray by the first wedge-shaped birefringent crystal plate 1, and the extraordinary ray from the second wedge-shaped birefringent crystal plate 5 is retained as an extraordinary ray by the first wedge-shaped birefringent crystal plate 1. Hence, light exiting from the first wedge-shaped birefringent crystal plate 1 can be prevented from being incident on the core of the optical fiber 6 on the incident side, so that a high isolation can be maintained.

Moreover, in the polarization independent optical isolator according to the embodiment, the condition of "3 mm≥f≥18.2/$\theta a$ (mm)" is satisfied, where f represents the focal length of each of the lenses 8 and 9 used as the collimators. In addition, the ordinary optical fibers 6 and 7 having a core diameter of 6 μm and a cladding diameter of 125 μm are used. Hence, the amount of shift of the optical feedback on the edge surface of the optical fiber 6 is larger than 62.5 μm, which is the radius of the cladding.

Accordingly, the optical system present on the inlet side of the incident side optical fiber is not damaged due to the coupling of the optical feedback with the cladding of the fiber 6.

Hereinafter, Examples of the present invention will be described specifically.

Example 1

A magnetic garnet single crystal constituting a Faraday rotator was grown by a liquid phase epitaxial method, and had a thickness adjusted by grinding to obtain a Faraday rotation angle of 45 degrees.

In addition, $YVO_4$ single crystals each having a wedge angle θb of 5.7 degrees were used as wedge-shaped birefringent crystal plates. As a result, the incident angle θa (see FIG. 1B) of imaginary light on sapphire single crystal plates was adjusted to 6.06 degrees, the imaginary light being represented by the bisector of the angle formed by the optical axes of an ordinary ray and an extraordinary ray separated by the wedge-shaped birefringent crystal plate. For light from a YAG laser having a wavelength of 1.06 μm, a $YVO_4$ single crystal has a refractive index $n_o$ for an ordinary ray of 1.9571, and a refractive index $n_e$ for an extraordinary ray of 2.1650. For this reason, in the case of YAG laser light traveling from the first wedge-shaped birefringent crystal plate to the second wedge-shaped birefringent crystal plate, the optical axis of the ordinary ray was shifted by about 5.47 degrees, and the optical axis of the extraordinary ray was shifted by 6.66 degrees.

In addition, to secure a condition under which the angle formed by the optical path of each of the ordinary ray and the extraordinary ray which had been separated by the wedge-shaped birefringent crystal plate, and which were incident on the sapphire single crystal plate and the c-axis of sapphire single crystal plates was 0.74 degrees or less, sapphire single crystal plates were prepared whose offset angles θoff (see FIG. 1B) from the c-plane were adjusted in the range from 3.05 to 3.85 degrees.

The sapphire single crystal plates were bonded with an adhesive onto the both sides of the magnetic garnet crystal in such a manner that the c-planes of the sapphire single crystal plates were parallel to each other. Then, the stack was cut into small pieces. Thus, a Faraday rotator provided with sapphire single crystal plates was fabricated.

The thus fabricated Faraday rotator was placed between the first wedge-shaped birefringent crystal plate 1 and the second wedge-shaped birefringent crystal plate 5 with light transmitting surfaces of the sapphire single crystal plates 2 and 4 being parallel to non-inclined light transmitting surfaces of the wedge-shaped birefringent crystal plates 1 and 5, as shown in FIG. 4. Thus, a polarization independent optical isolator according to Example 1 was fabricated.

Inclined surfaces of the first and second wedge-shaped birefringent crystal plates 1 and 5 were positioned on the sides opposite to the sides facing to the magnetic garnet single crystal 3, and the first and second wedge-shaped birefringent crystal plates 1 and 5 were placed in such a manner that the inclined surfaces thereof were parallel to each other. Note that, although not shown in FIG. 4, holders for holding the crystals and a magnet for magnetically saturating the magnetic garnet single crystal were placed outside (on the side of the non-light transmitting surfaces of the magnetic garnet single crystal) the magnetic garnet single crystal 3. In addition, anti-reflection coatings for the employed wavelength were provided on the light transmitting surfaces of each of these single crystal plates.

Then, YAG laser light was caused to be incident on a polarization independent optical isolator according to Example 1, and the characteristics thereof were evaluated. As a result, an isolation of 50 dB was successfully achieved, because the deterioration in the extinction ratio in the sapphire single crystal plates on the optical path was minimized.

In addition, optical fibers 6 and 7 each having a core diameter of 6 μm and a cladding diameter of 125 μm were employed, and collimator lenses 8 and 9 each having a focal length of 3 mm were employed for the polarization independent optical isolator. Here, the optical feedback did not couple with the cladding of the optical fiber 6. However, when collimator lenses each having a focal length of 2 mm were used instead, the optical feedback coupled with the cladding of the optical fiber 6, and there was a possibility that the optical feedback would damage the optical system present on the inlet side of the incident side optical fiber.

Example 2

A polarization independent optical isolator was fabricated by use of $YVO_4$ single crystals each having a wedge angle θb of 7.0 degrees as the wedge-shaped birefringent crystal plates. The polarization independent optical isolator functioned in the same manner as in Example 1, except that the incident angle θa (see FIG. 1B) of imaginary light on the sapphire single crystal plates was adjusted to 7.46 degrees, the imaginary light being represented by the bisector of the angle formed by the optical axes of an ordinary ray and an extraordinary ray separated by the wedge-shaped birefringent crystal plate, and that, in order to secure a condition under which the angle formed by the optical path of each of the ordinary ray and the extraordinary ray which had been separated by the wedge-shaped birefringent crystal plate, and which were incident on the sapphire single crystal plate and the c-axis of the sapphire single crystal plates was 0.74 degrees or less, sapphire single crystal plates were prepared whose offset angles θoff (see FIG. 1B) from the c-plane thereof were adjusted in the range from 3.92 to 4.57 degrees.

Then, YAG laser light was caused to be incident on the polarization independent optical isolator according to Example 2, and the characteristics thereof were evaluated. As a result, an isolation of 50 dB was achieved, because the deterioration in the extinction ratio in the sapphire single crystal plates on the optical path was minimized.

In addition, when collimator lenses each having a focal length of 3 mm were employed for also the polarization independent optical isolator, the optical feedback did not couple with the cladding of the optical fiber 6. However, when collimator lenses each having a focal length of 2 mm were used instead, the optical feedback coupled with the cladding of the optical fiber 6, and there was a possibility that the optical feedback would damage the optical system present on the inlet side of the incident side optical fiber.

Example 3

A polarization independent optical isolator was fabricated by use of $YVO_4$ single crystals each having a wedge angle θb of 8.0 degrees as the wedge-shaped birefringent crystal plates. The polarization independent optical isolator functioned in the same manner as in Example 1, except that the incident angle θa (see FIG. 1B) of imaginary light on the sapphire single crystal plates was adjusted to 8.53 degrees, the imaginary light being represented by the bisector of the angle formed by the optical axes of an ordinary ray and an extraordinary ray separated by the wedge-shaped birefringent crystal plate, and that, in order to secure a condition under which the angle formed by the optical path of each of the ordinary ray and the extraordinary ray which had been separated by the wedge-shaped birefringent crystal plate, and which were incident on the sapphire single crystal plate and the c-axis of the sapphire single crystal plates was 0.74 degrees or less, sapphire single crystal plates were prepared whose offset angles θoff (see FIG. 1B) from the c-plane thereof were adjusted in the range from 4.59 to 5.12 degrees.

Then, YAG laser light was caused to be incident on the polarization independent optical isolator according to Example 3, and the characteristics thereof were evaluated. As a result, an isolation of 50 dB was achieved, because the deterioration in the extinction ratio in the sapphire single crystal plates on the optical path was minimized.

In addition, when collimator lenses each having a focal length of 3 mm were employed also for the polarization independent optical isolator, the optical feedback did not couple with the cladding of the optical fiber 6. However, when collimator lenses each having a focal length of 2 mm were used instead, the optical feedback coupled with the cladding of the optical fiber 6, and there was a possibility that the optical feedback would damage the optical system present on the inlet side of the incident side optical fiber.

Example 4

A polarization independent optical isolator was fabricated by use of YVO$_4$ single crystals each having a wedge angle θb of 9.0 degrees as the wedge-shaped birefringent crystal plates. The polarization independent optical isolator functioned in the same manner as in Example 1, except that the incident angle θa (see FIG. 1B) of imaginary light on the sapphire single crystal plates was adjusted to 9.61 degrees, the imaginary light being represented by the bisector of the angle formed by the optical axes of an ordinary ray and an extraordinary ray separated by the wedge-shaped birefringent crystal plate, and that, in order to secure a condition under which the angle formed by the optical path of each of the ordinary ray and the extraordinary ray which had been separated by the wedge-shaped birefringent crystal plate, and which were incident on the sapphire single crystal plate and the c-axis of the sapphire single crystal plates was 0.74 degrees or less, sapphire single crystal plates were prepared whose offset angles θoff (see FIG. 1B) from the c-plane thereof were adjusted in the range from 5.26 to 5.67 degrees.

Then, YAG laser light was caused to be incident on the polarization independent optical isolator according to Example 4, and the characteristics thereof were evaluated. As a result, an isolation of 50 dB was achieved, because the deterioration in the extinction ratio in the sapphire single crystal plates on the optical path was minimized.

In addition, when collimator lenses each having a focal length of 3 mm were employed for the polarization independent optical isolator, the optical feedback did not couple with the cladding of the optical fiber 6. Moreover, collimator lenses each having a focal length of 2 mm were used instead, the optical feedback did not couple with the cladding.

Comparative Example 1

A polarization independent optical isolator was fabricated by use of YVO$_4$ single crystals each having a wedge angle θb of 5.0 degrees as the wedge-shaped birefringent crystal plates. The polarization independent optical isolator functioned in the same manner as in Example 1, except that the incident angle θa (see FIG. 1B) of imaginary light on the sapphire single crystal plates was adjusted to 5.32 degrees, the imaginary light being represented by the bisector of the angle formed by the optical axes of an ordinary ray and an extraordinary ray separated by the wedge-shaped birefringent crystal plate, and that, in order to secure a condition under which the angle formed by the optical path of each of the ordinary ray and the extraordinary ray which had been separated by the wedge-shaped birefringent crystal plate, and which were incident on the sapphire single crystal plate and the c-axis of the sapphire single crystal plates was 0.74 degrees or less, sapphire single crystal plates were prepared whose offset angles θoff (see FIG. 1B) from the c-plane thereof were adjusted in the range from 2.58 to 3.47 degrees.

Then, YAG laser light was caused to be incident on the polarization independent optical isolator according to Comparative Example 1, and the characteristics thereof were evaluated. As a result, an isolation of 50 dB was achieved, because the deterioration in the extinction ratio in the sapphire single crystal plates on the optical path was minimized.

However, in both the cases where collimator lenses each having a focal length of 3 mm and collimator lenses each having a focal length of 2 mm were for the polarization independent optical isolator according to Comparative Example 1, the optical feedback coupled with the cladding of the optical fiber 6, and there was a possibility that the optical feedback would damage the optical system present on the inlet side of the incident side optical fiber.

Comparative Example 2

A polarization independent optical isolator was fabricated by use of YVO$_4$ single crystals each having a wedge angle θb of 10.0 degrees as the wedge-shaped birefringent crystal plates. The polarization independent optical isolator functioned in the same manner as in Example 1, except that the incident angle θa (see FIG. 1B) of imaginary light on the sapphire single crystal plates was adjusted to 10.70 degrees, the imaginary light being represented by the bisector of the angle formed by the optical axes of an ordinary ray and an extraordinary ray separated by the wedge-shaped birefringent crystal plate, and that, in order to secure a condition under which the angle formed by the optical path of each of the ordinary ray and the extraordinary ray which had been separated by the wedge-shaped birefringent crystal plate, and which were incident on the sapphire single crystal plate and the c-axis of the sapphire single crystal plate was 0.74 degrees or less, sapphire single crystal plates were prepared whose offset angles θoff (see FIG. 1B) from the c-plane thereof were adjusted in the range from 5.93 to 6.22 degrees.

Then YAG laser light was caused to be incident on the polarization independent optical isolator according to Comparative Example 2, and the characteristics thereof were evaluated. As a result, an isolation of 50 dB was achieved, because the deterioration in the extinction ratio in the sapphire single crystal plates on the optical path was minimized.

However, since the incident angle θa of imaginary light on the sapphire single crystal plate (see FIG. 1B) was as large as 10.70 degrees in the polarization independent optical isolator according to Comparative Example 2, it was necessary to increase the sizes of the wedge-shaped birefringent crystal plates and the Faraday rotator, and hence Comparative Example 2 was uneconomical.

Moreover, such a disadvantage was found that, because of the wedge angle θb of the wedge-shaped birefringent crystal plates of as large as 10.0 degrees, the separation distance between the ordinary ray and the extraordinary ray was increased, and in turn the PDL (polarization dependent loss) was increased.

Possibility of Industrial Application

The polarization independent optical isolator according to the present invention undergoes only slight deterioration in optical isolation functions, even when high-power light is incident. Hence, polarization independent optical isolator has a potential for wide use as an optical isolator for a high-power laser used for optical communications, laser processing, and the like.

What is claimed is:

1. A polarization independent optical isolator comprising:
a pair of wedge-shaped birefringent crystal plates placed on an optical path;
a Faraday rotator which is placed, on the optical path, between the wedge-shaped birefringent crystal plates and which is made of a magnetic garnet single crystal;
collimator lenses which are placed, on the optical path, at positions outside the respective wedge-shaped birefringent crystal plates in relation to the Faraday rotator taken as a center; and
sapphire single crystal plates bonded to light transmitting surfaces of the Faraday rotator, respectively, wherein
the pair of wedge-shaped birefringent crystal plates are each made of a $YVO_4$ single crystal,
a light transmitting surface of each of the sapphire single crystal plates is formed in such a manner as to be parallel to a non-inclined light transmitting surface of a corresponding adjacent one of the wedge-shaped birefringent crystal plates, and to be offset from a c-plane of the sapphire single crystal plate, and
the polarization independent optical isolator is set to satisfy the following conditions:
an incident angle $\theta a$ of imaginary light on each of the sapphire single crystal plate is 6.06 to 9.61 degrees, the imaginary light being represented by a bisector of an angle formed by optical axes of an ordinary ray and an extraordinary ray separated by each of the wedge-shaped birefringent crystal plates;
an offset angle $\theta$off of the light transmitting surface from the c-plane of each sapphire single crystal plate is 3.05 to 5.67 degrees; and
3 mm$\geq$f$\geq$18.21/$\theta a$ (mm), where f represents a focal length of each of the collimator lenses.

2. The polarization independent optical isolator according to claim 1, wherein
optical fibers each having a cladding diameter of 125 μm are placed, on the optical path, at positions outside the respective collimator lenses in relation to the Faraday rotator taken as a center.

3. The polarization independent optical isolator according to claim 2, which has a peak isolation characteristic of 40 dB or more.

4. The polarization independent optical isolator according to claim 3, which is applied to an optical isolator for a fiber laser.

5. The polarization independent optical isolator according to claim 2, which is applied to an optical isolator for a fiber laser.

6. The polarization independent optical isolator according to claim 1, which has a peak isolation characteristic of 40 dB or more.

7. The polarization independent optical isolator according to claim 6, which is applied to an optical isolator for a fiber laser.

8. The polarization independent optical isolator according to claim 1, which is applied to an optical isolator for a fiber laser.

* * * * *